United States Patent [19]

De Luca

[11] 4,069,509

[45] Jan. 17, 1978

[54] THREE ELEMENT GAS TUBE PROTECTOR MODULE

[75] Inventor: Paul V. De Luca, Port Washington, N.Y.

[73] Assignee: Porta Systems Corporation, Syosset, N.Y.

[21] Appl. No.: 754,545

[22] Filed: Dec. 27, 1976

[51] Int. Cl.$^2$ ................................................ H02H 7/20

[52] U.S. Cl. ...................................... 361/124; 337/32; 361/119

[58] Field of Search ............... 361/124, 125, 119, 118, 361/120, 117; 337/32, 33, 34, 28, 31

[56] References Cited

U.S. PATENT DOCUMENTS 3,947,730 3/1976 De Luca et al. ..................... 361/124

*Primary Examiner*—J D Miller

*Assistant Examiner*—Patrick R. Salce

*Attorney, Agent, or Firm*—Charles E. Temko

[57] ABSTRACT

A telephone protector module utilizing a three element gas tube discharge device and having heat-actuated overload protection means causing both tip and ring circuits to be simultaneously grounded upon the occurrence of an overload.

3 Claims, 3 Drawing Figures

THREE ELEMENT GAS TUBE PROTECTOR MODULE

BACKGROUND OF THE INVENTION

This invention relates generally to the field of modular telephone protector devices employed in telephone offices for protecting individual telephone circuits, as exemplified by U.S. Pat. No. 3,947,730 granted Mar. 19, 1976 and assigned to the same assignee as the instant application.

Devices of this type are normally provided with a heat-sensitive spring-loaded structure which, upon the occurrence of a continued surge of excessive current in the line, serve to ground the line to thereby discharge the current. As each telephone circuit includes a so-called "ring" line operating on one voltage, and a "tip" line for conversation, it is customary to protect both lines by separate heat-sensitive devices incorporated in the module, although it is also known to provide means whereby upon the actuation of one heat-sensitive device, a part of the overload current is diverted to assist in the actuation of the other. In some devices, means is provided whereby upon the grounding of an affected tip or ring circuit, the other circuit is opened.

Most protective modules employ arcing devices, usually in the form of a pair of carbon blocks defining a gap. Arcing devices are useful for momentary surges of excessive voltage, as, for example, when the line is struck by a flash of lightning. However, in the case of a continuous surge of excessive current, as might happen when a power cable falls upon the telephone line, the excessive flow of current creates heat which will destroy the telephone line unless such current is promptly grounded. It is known in the art to employ heat-sensitive devices which will cause such grounding, bypassing the arcing device. It is also known in the art to use gaseous discharge devices in lieu of the spaced carbon blocks. This later device has been refined to provide the equivalent of a pair of gas tubes with a common ground contact. The tube is mounted transversely in the module casing element.

SUMMARY OF THE INVENTION

Briefly stated, the invention contemplates the provision of an improved protector module incorporating a single, so-called three element, gas tube and a single heat-sensitive means operative upon the occurrence of an overload in either the tip or ring circuits to ground both circuits simultaneously. The disclosed embodiment is characterized in the use of a reduced number of parts as contrasted with prior art devices, thereby substantially reducing the cost of manufacture and assembly.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
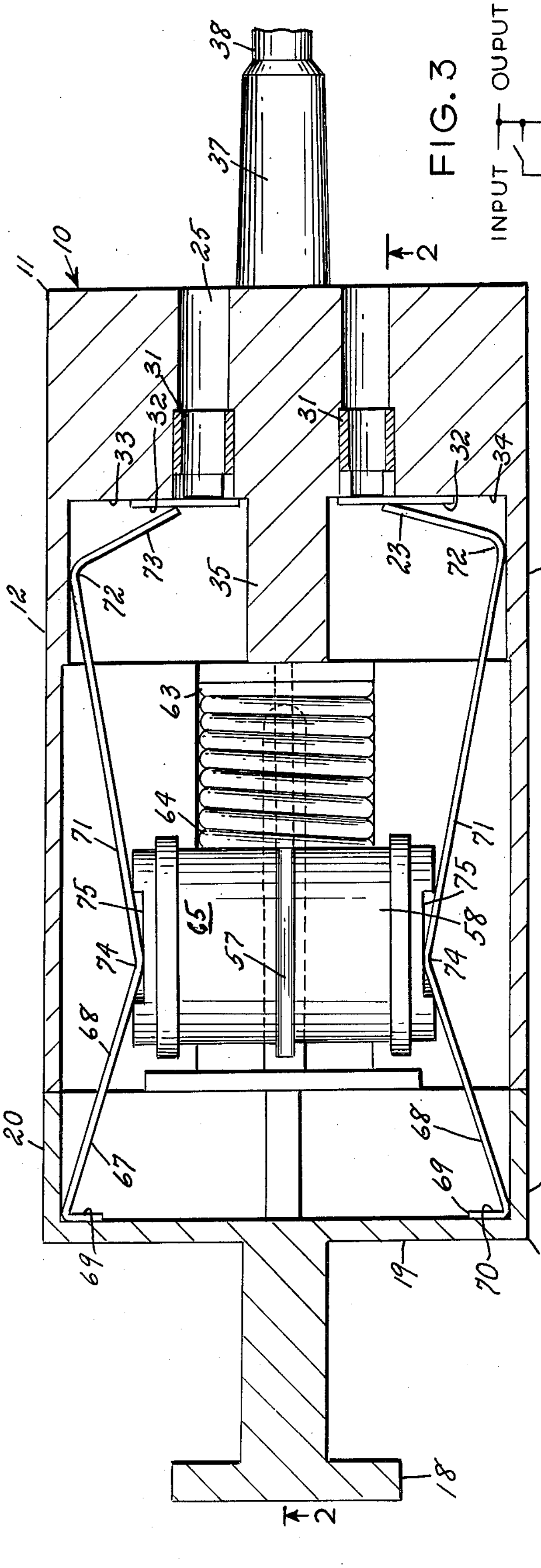
FIG. 1 is a central longitudinal sectional view of an embodiment of the invention as seen from the plane 1—1 in FIG. 2.
Figure 3:
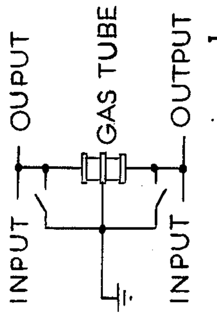
FIG. 3 is a schematic diagram showing electrical connections.

In accordance with the invention, the device, generally indicated by reference character 10, includes a casing element 11 of conventional configuration, and having a plurality of oppositely disposed side walls 12, 13, 14 and 15. The walls 13–15 define an opening 16 engaged by a cap element 17 having a manually engageable handle extending laterally from the plane of an end wall 19 thereof. Extending from the plane of the end wall 19 are side walls 20, 21, 22 and 23 which mate with the free edges of walls 12 to 15, inclusive, respectively.

Figure 2:
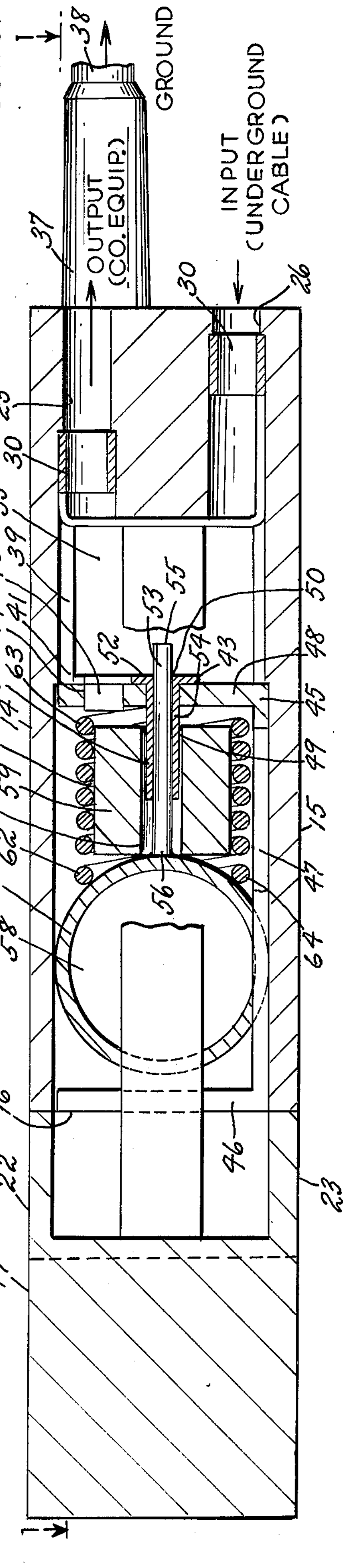
FIG. 2 is a central longitudinal sectional view as seen from the plane 2—2 in FIG. 1.

At an opposite end 24 of the casing element 11 are a first pair of cylindrical recesses 25 and a second pair of cylindrical recesses, one of which is indicated by reference character 26 (FIG. 2). These recesses accommodate input contacts 30 and output contacts 31 positioned therein for the reception of corresponding male contacts (not shown) on a telephone connector block of known type. Interconnecting the contacts 30 and 31 are members 32 which are positioned at the inner ends of first and second recesses 33 and 34, respectively, in the casing element 11, the recesses being separated by a septum 35.

The casing element 11 mounts a grounding prong 37 of known type, including an external portion 38 and an internal portion 39 having a terminal projection 40 on an inner end 41 thereof.

A heat-sensitive element 43 includes a U-shaped conductive member 45 having a first end portion 46, a longitudinally disposed portion 47 and a second end portion 48 lying in a plane parallel to the first end portion 46. The portion 48 includes a first opening 49, the edges of which engage the projection 40 to establish electrical communication therewith. A second opening 50 supports a tubular member 51 having a flanged end portion 52. A rod-like member 53 is lightly soldered to the inner surface of the tubular member 50 in well known manner using a thin film of this meltable material generally indicated by reference character 54. The member 53 includes a first free end 55, and a second end 56 formed integrally with a ground contact 57 of a so-called three element gas tube 58 of generally cylindrical configuration. An insulative spring spacer member 59 includes a centrally disposed bore 60 surrounding the tubular member 51, and an outer cylindrical surface 61 which supports a coil spring 62. A first end 63 of the spring 62 bears against the inner surface of the end portion 48, and a second end 64 thereof contacts the outer surface 65 of the gas tube 58, as best seen in FIG. 2.

As best seen in FIG. 1, a pair of elongated conductive members 67 and 68 are retained in the position shown by engagement with the interior of the casing element 11 and cap 17. Each member 67–68 includes a first end 69 interconnected by a bent portion 70 to a resilient bowed portion 71, in turn interconnected to a second bent portion 72 to a second end portion 73 which resiliently contacts the exposed surface of a respective connecting member 32. The apex 74 of each bowed portion engages a groove 75 at each conductive end of the gas tube 58 to establish a line of conductive contact, irrespective of the relative position of the gas tube.

It will be observed that because the gas tube 58 provides, in effect, an arcing device for both the tip and ring circuits, only one such tube is necessary per device 10. As a consequence, only a single heat-sensitive element 43 is required, and the occurrence of an overload current in either the tip or ring circuits will result in heat being conducted up the rod-like member 53 from the tube 58 to result in melting the soldered interconnection between the member 53 and the tubular member 51, at which time the spring 62 expands to move the gas tube 58 into contact with the first end portion 46. When this occurs, excessive currents present on either the tip or ring circuits are immediately conducted through the members 67 and 68 to the U-shaped conductive member 45, and the grounding prong 37.

It will be observed that because of the reduction in the number of parts comprising the heat-sensitive element 43 and the use of separate conductive members 67 and 68, the assembly of the device is a relatively simple matter, it being necessary only to fit the opening 49 to the projection 40, and insert the members 67 and 68 before interconnecting the cap 17 with the casing element 11. The element 43 may be assembled with the gas tube 58 in position as shown in FIG. 2 as a unit prior to insertion.

I wish it to be understood that I do not consider the invention limited to the precise details of structure shown and set forth in this specification, for obvious modifications will occur to those skilled in the art to which the invention pertains.

I claim:

1. An improved telephone line surge protecting device comprising: a casing element having a principal longitudinal axis including a plurality of oppositely disposed side walls defining a cavity; interconnected telephone input and output terminals having inner ends communicating with said cavity; a grounding prong element penetrating said casing element and communicating with said cavity; a temperature sensitive element mounted generally coaxially with respect to said principal axis of said casing element for movement between first and second positions within said cavity; resilient means urging said temperature sensitive element from said first to said second position; said temperature sensitive element including a transversely extending multisection gaseous discharge device having conductive end portions and a medially positioned grounding projection extending laterally therefrom; a generally U-shaped conductive member including a first end portion selectively contacting the conductive ends of said gaseous discharge device, and a second end generally parallel to said first end portion and communicating with said grounding prong element; said second portion mounting a hollow tube element surrounding said grounding projection on said gaseous discharge device and fixed thereto against the action of said resilient means by a meltable material; and a pair of resilient elongated electrically conducting contact members slidably contacting the conductive ends of said gaseous discharge device and the inner ends of said input and output terminals; whereby upon the melting of said meltable material said resilient means serves to move said gaseous discharge device into contact with said first end portion of said U-shaped member, resulting in current being conducted from said inner ends of said input and output terminals through the conductive ends of said gaseous discharge device to said U-shaped member and said grounding prong.

2. Structure in accordance with claim 1, further characterized in said contact members being of bowed configuration, and serving to center said gaseous discharge device relative to the longitudinal axis of said casing element.

3. Structure in accordance with claim 2, further characterized in said casing element including a removable cap member at one end thereof, said cap member upon engagement with said casing element serving to compress said contact members to urge the same into resilient contact with said gaseous discharge device and said input and output terminals.

* * * * *